April 14, 1925.

W. C. HOUGH

TIRE OPENING MACHINE

Filed Aug. 4, 1920

Inventor.
William C. Hough

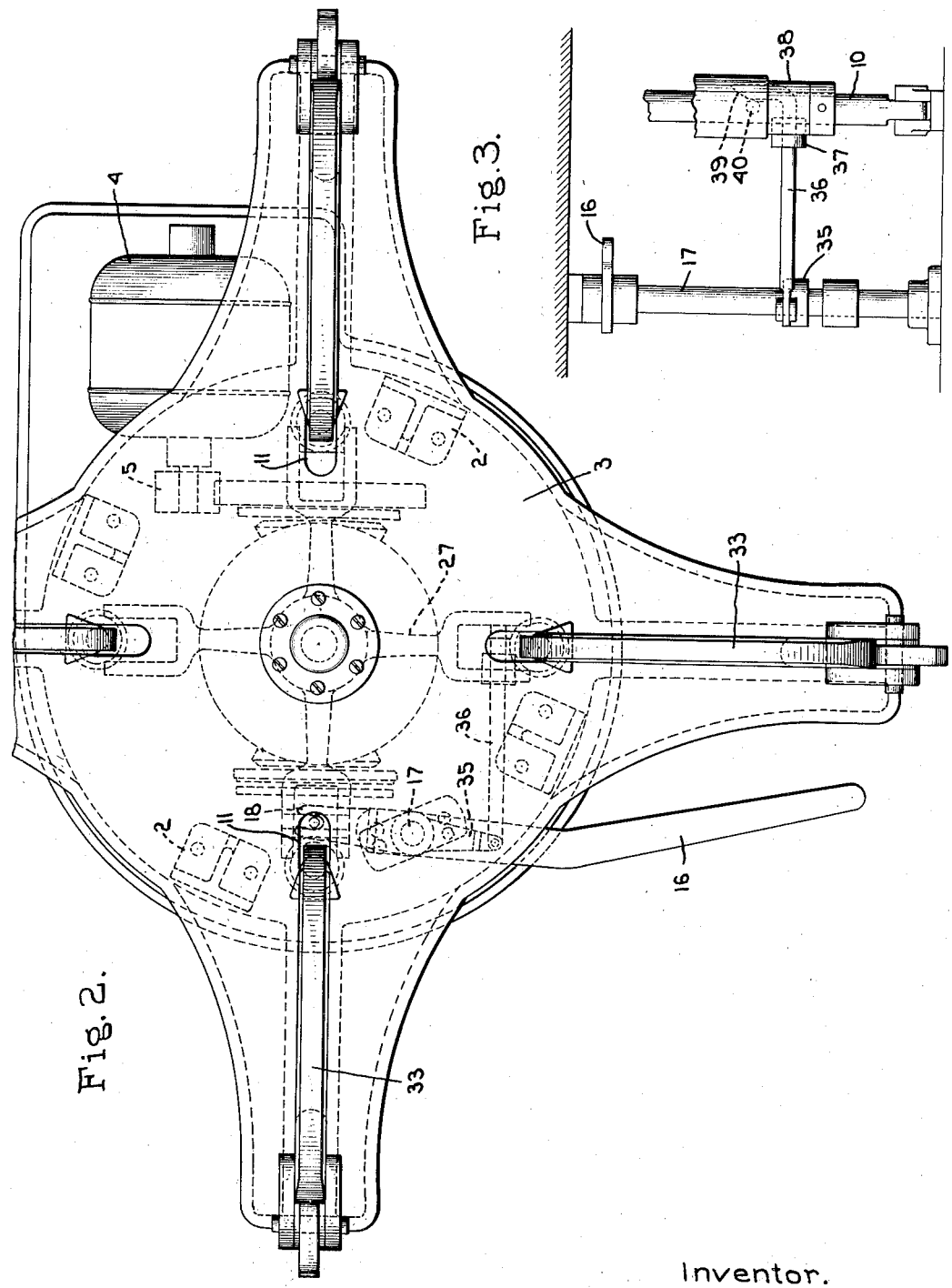

Patented Apr. 14, 1925.

1,533,990

UNITED STATES PATENT OFFICE.

WILLIAM C. HOUGH, OF CUYAHOGA FALLS, OHIO, ASSIGNOR TO THE FIRESTONE TIRE AND RUBBER COMPANY, OF AKRON, OHIO, A CORPORATION OF OHIO.

TIRE-OPENING MACHINE.

Application filed August 4, 1920. Serial No. 401,181.

*To all whom it may concern:*

Be it known that I, WILLIAM C. HOUGH, a citizen of the United States, residing at Cuyahoga Falls, in the county of Summit and State of Ohio, have invented certain new and useful Improvements in Tire-Opening Machines, of which the following is a specification.

This invention relates to a machine for the purpose of opening tires so that the inner tubes may be inserted in assembling the tire and tube for shipment. The machine is designed for use in spreading the beads of large size pneumatic tires so that the tubes may be readily and easily inserted.

In the drawings accompanying this application is shown one form of the machine, it being obvious that the precise details are non-essential and may be varied without departing from the invention herein disclosed.

Fig. 2 is a plan.

Fig. 3 is a detail view of the clutch disengaging element.

Figure 1:
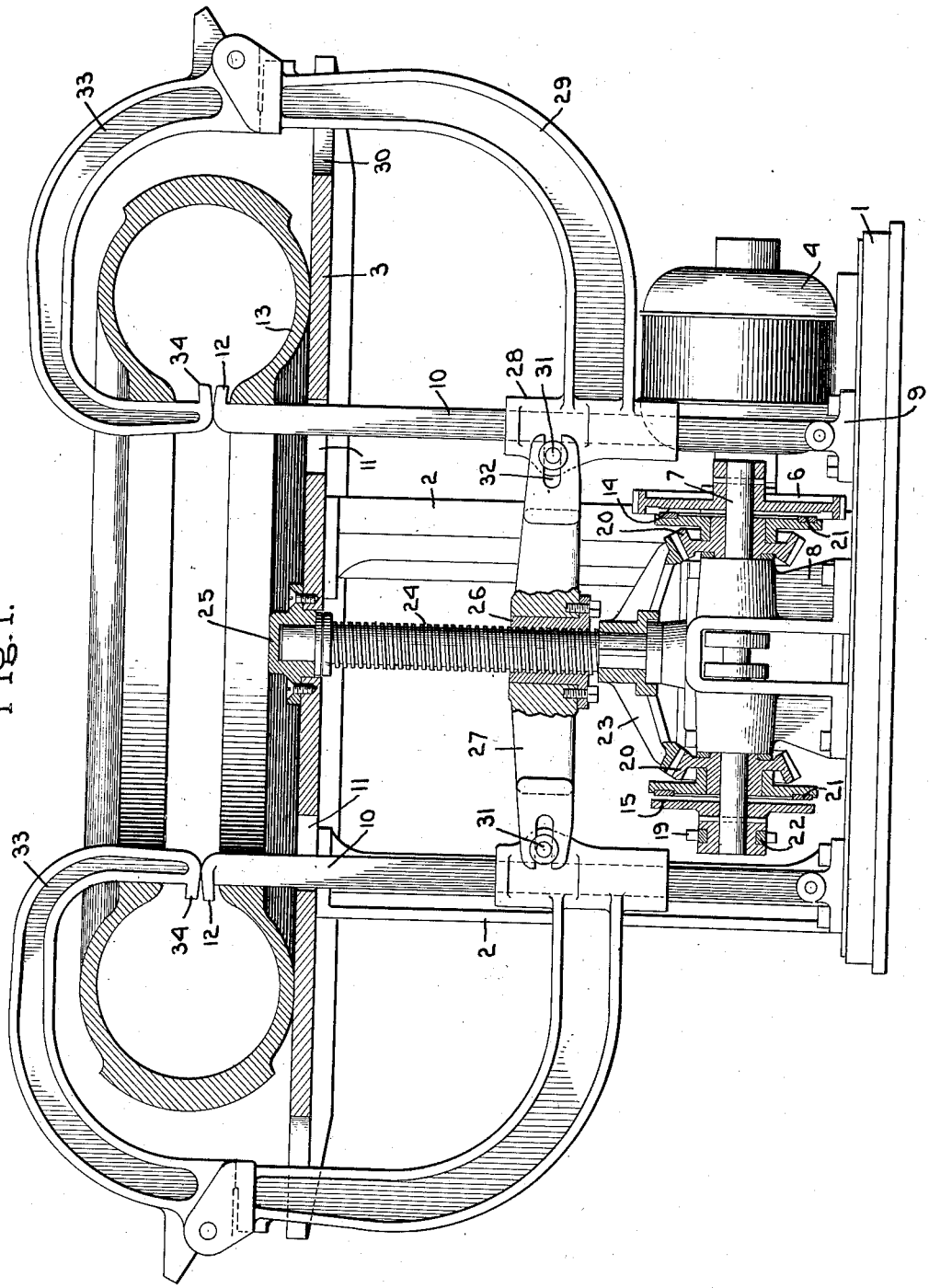
Fig. 1 is a vertical central section through the machine.

Referring to the drawings, 1 represents the base or foundation of the machine, from which rise standards 2, supporting a table or platform 3, on which the tire is laid. On the base is supported a motor 4 having a pinion 5 which engages with a gear 6 secured to a shaft 7 mounted in standards 8, centrally of the base.

Arranged about the base 1 at a suitable number of points, preferably four in number, are bearings or standards 9, on which are pivotally mounted arms or levers 10, the upper ends of which are received in slots 11 in the table 3, and are formed with hooks 12 designed to enter the space between the beads of the tire 13.

The inner side of gear 6 is provided with a clutch face 14, and the opposite end of the shaft 7 carries a clutch member 15. The shaft is designed to be shifted by a lever 16, secured to a rocking shaft 17 and carrying spanner arms 18 received over pins 19 on ring 22 carried by the clutch 15. On either side of standard 8 are arranged oppositely facing bevel gears 20 each being provided with a clutch surface 21 to engage clutch surfaces 14 and 15 depending upon which direction the shaft 7 is to be rotated. Meshing with gears 20 is a single gear 23 secured to the lower end of vertical shaft 24, stepped in the bearing or standard 8, and guided at the upper end in a socket 25 located centrally of table 3.

The shaft 24 is screw-threaded and engages a nut or sleeve 26 on which is supported a spider 27 having a number of arms equal to the levers 10.

On each lever 10 is slidably received a sleeve 28, having integrally formed therewith an arm 29, which extends outwardly and upwardly until above the top of the table, slots 30 being provided to receive the ends of the several arms. Each sleeve carries pins 31 received in slots 32 formed in the outer ends of the arms 27, the slots being of sufficient width to permit rocking of the arms 10 about their pivots.

On the upper ends of arms 29 are pivoted curved arms 33, the outer ends of which are bent downwardly and formed with hooks 34 which rest on the hooks 12 between the beads of the tire. The arm 33 may be swung upwardly when it is desired to place or remove the tire.

To the shaft 17 is secured a lever 35, one end of which is connected to a link 36, and extends toward one of the members 10. The other end of the link passes through a bearing 37 formed as a part of collar 38 secured on the member 10 at about the lowermost point of descent of sleeve 28. The link 36 is bent upwardly and extends along the member 10 being provided with a beveled surface 39 arranged to be in the path of a pin 40 secured on the sleeve 38. The object of this arrangement is to insure the withdrawal of the clutch drive upon downward descent of the spider 27.

When it is desired to operate the machine, the arms 33 are thrown back and the tire placed in position, the arms 10 being moved inwardly, if necessary. The swinging arms are now brought down and the hooks introduced between the beads of the tire. The lever 16 is then operated to throw the proper clutch into engagement and the screw elevates the upper set of hooks opening the tire to the desired extent. After the tube is inserted, the mechanism is reversed and the tire casing closed.

It is obvious that the invention herein described is not limited in form or detail to that shown, but may be changed or modified within the scope of the invention.

I claim:

A machine for opening tire casings, having in combination, a table to support the tire casing, a set of arms arranged in a circle and extending through the table, means on the ends of said arm to engage one bead of the tire casing, sleeves slidably mounted on the said arms. A spider located within the arms the spokes of the spider being pivotally connected at their outer ends to the said sleeves. A screw threaded shaft extending through the hub of the spider, a gear upon the lower end of the said shaft, a horizontal shaft beneath gears freely mounted upon the drive shaft and adapted to mesh with said first named gear, manually operated means for connecting and disconnecting each of the said beveled gears with the drive shaft to elevate and lower the said spider, a second set of arms extending from the sleeve and encircling the table, and means on the ends of said last named arms to engage the other bead of the tire casing.

WILLIAM C. HOUGH.